Patented Feb. 5, 1946

2,394,526

UNITED STATES PATENT OFFICE 2,394,526

ALIPHATIC SUBSTITUTED GUANAMINES

Jack Theo Thurston, Cos Cob, Conn., assignor to American Cyanamid Company, New York, N. Y., a corporation of Maine No Drawing. Application August 30, 1941, Serial No. 409,143

10 Claims. (Cl. 260—249.5)

This invention relates to 2-aliphatic substituted 4,6-diamino-1,3,5-triazines, referred to in this specification as 2-aliphatic substituted guanamines, having negative substituents in the aliphatic chain, and to a process of preparing.

Formoguanamine has been produced by the reaction of an ester of formic acid with biguanide and the process operates satisfactorily. When, however, the same procedure is attempted with higher acids, the results are not satisfactory. Propionoguanamine can be made in rather good yields by reaction of a propionate with biguanide, but when the carbon chain of the ester gets longer, the yields drop off to the vanishing point and the process cannot be used.

According to the present invention I have found that if the ester has a negative group such as cyano, carboxy, carbalkoxy, sulfo, nitro, acid amide, carbonyl, hydroxy, alkoxy, and the like, the ester group appears to be activated and satisfactory yields of guanamines are obtained. This result is all the more surprising as the activation appears within wide limits to be independent of the position of the negative group in the chain. Ordinarily the influence of one group on a reaction does not extend very far along the hydrocarbon chain, but in the case of the reaction of the present invention the activation takes place even when the negative group is very far removed which is an unusual and a surprising departure from the ordinary course of organic reactions. The reason for the peculiar behavior of the reaction of the present invention has not been fully determined and it is not intended to limit the present invention to any theory of action.

The guanamines prepared according to the present invention differ in their solubility depending on the substituents, and similarly resins which can be obtained by reacting the guanamines with formaldehyde likewise differ in their properties. Some show good solubility in hydrocarbon solvents and others show water-solubility.

Among the most practically important guanamines which can be prepared by following the procedure of the present invention are those in which two amino groups of the triazine ring are unsubstituted. However, the invention is not limited to the preparation of these products or to the products themselves, and the reaction can be carried out also with substituted biguanides such as phenyl biguanide, allyl biguanide or dimethyl biguanide, to produce the corresponding N-substituted guanamines. The effect of the activation of the negative groups is not so marked in the case of reactions with substituted biguanides and in some cases the addition of condensing agents such as metal alkoxides may be necessary in order to obtain satisfactory speed and completeness of reaction. In the case of unsubstituted biguanide, condensing agents are in general not necessary, which is one of the marked advantages of the process of the present invention.

Many of the compounds produced by the process of the present invention are new chemical compounds and some of them are claimed as such in the present case. Others, however, form the subject matter of copending applications and are not claimed as new products herein. Thus, for example, halogen substituted guanamines are claimed in my application Serial No. 409,142, filed August 30, 1941, carboxy substituted are described and claimed in my copending application Serial No. 409,131, filed August 30, 1941, acid amide substituted are described and claimed in the copending application of Thurston and Nagy, Serial No. 409,132, filed August 30, 1941, the sulfo-substituted guanamines are described and claimed in my copending application Serial No. 409,145, filed August 30, 1941, hydroxy substituted are described and claimed in my copending application Serial No. 409,140, filed August 30, 1941, and ketoguanamines as covered in my copending application Serial No. 409,135, filed August 30, 1941.

In general the preferred process of the present invention operates best in the presence of a suitable solvent for the biguanide and/or ester. I have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if an alcohol is used as a solvent corresponding to the alcohol radical of the ester, no separation problem arises. Excellent results are however obtained with the other lower monohydric alcohols such as the ether alcohols, for example, the ethyl ether of ethylene glycol.

The invention will be described in greater detail in conjunction with the following specific examples. The parts are by weight.

Example 1

Cyanoacetoguanamine

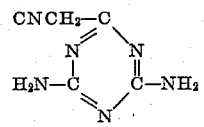

Twenty-four parts of biguanide were dissolved in 160 parts of methanol, the solution was filtered, and 29 parts of ethyl cyanoacetate added. The guanamine began to precipitate as soon as the ester was added and within three to five minutes the reaction was completed. After recrystallization from water, the product was recovered in the form of a light yellow powder melting at 273° C., the yield being about 72%.

Example 2
2-(4-ethyl-4-ethyl-2-cyano) octeno guanamine $$CH_3(CH_2)_3CH-CH=C\underset{\underset{C_2H_5}{|}}{\phantom{X}}\underset{CN}{\phantom{X}}C\cdots$$

Fifty-six parts of biguanide were dissolved in 330 parts of methanol, clarified by filtration, and 134 parts of methyl-2-cyano-4-ethyl octenoate added. Crystallization began to take place immediately and the exothermic reaction mixture was cooled. After standing overnight, the crystalline product was recovered by filtration. The product was washed with water, alcohol, ethyl acetate, acetone, and ether, and was then in the form of a very insoluble white powder, melting at 323–326° C. with decomposition. The yield of product was about 74% and the analytical data was not conclusive enough to exclude the possibility that this compound might be a pyrimidine of the following formula:

The exact formula of this compound was not conclusively proven.

Example 3
Beta-ethoxypropionoguanamine 44 parts of ethyl beta-ethoxypropionate were mixed with a solution of 25 parts of biguanide dissolved in 160 parts of methanol. The reaction mixture was allowed to stand overnight at room temperature and crystallization occurred. The product was filtered, recrystallized from water and acetone, and formed fine white crystals, melting at 164–165° C., the yield being about 80%.

Example 4
Beta-amyloxypropionoguanamine 50 parts of amyl beta-amyloxypropionate were added to a solution of 20 parts of biguanide in 130 parts of methanol. The reaction mixture was allowed to stand overnight and the crystals were removed by filtration. The product, which was recrystallized from methanol, methyl acetate, and then acetone, was obtained in the form of fine white crystals, melting at 119–120° C. and the yield was slightly under 90%.

Example 5
Beta-oxydipropionoguanamine 50 parts of diethyl beta-oxydipropionate were added to a solution of 38 parts of biguanide dissolved in 240 parts of methanol. After standing a short time at room temperature, crystallization began to take place. When the reaction was completed the product was removed by filtration and recrystallized from water. The yield of fine white crystals melting at 310° C. was just under 75%.

Example 6
α-Bromoisovaleroguanamine

Sixty-three parts of ethyl α-bromisovalerate and 25 parts of biguanide were dissolved in 160 parts of methanol and permitted to stand. The guanamine slowly crystallized from the solvent solution and was removed by filtration and then recrystallized first from ethyl acetate, and then acetone. The yield of colorless crystals melting at 196–197° C. was about 57%.

Example 7
α,α-Dichlorostearoguanamine

Twenty-five parts of biguanide were dissolved in 160 parts of methanol and added to 6 parts of sodium metal dissolved in 80 parts of ethanol. To this solution was added 114 parts of ethyl α,α-dichlorostearate. After some time, the guanamine precipitated and was recovered in a slightly impure form. The yield was about 41%.

Example 8
Amyloxysuccinoguanamine and

β-Carboxy-amyloxypropionoguanamine

Forty-three parts of diamyl amyloxysuccinate were combined with 25 parts of biguanide in 100 parts of methanol. A precipitate starts forming almost immediately and after standing the product was filtered. This material was then extracted with water in order to remove the biguanide salt of β-carboxy-amyloxypropionoguanamine which was then precipitated from the water solution by acidification to a pH of about 4.0. The yield of β-carboxyamyloxypropionoguanamine, melting as 253–255° C. was 20.8%. The yield of amyloxysuccinoguanamine which was left from the above water extraction, was 64.6%. The yields were calculated on the ester.

Example 9

Itaconoguanamine

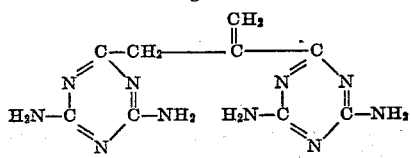

and

Methylene-β-carboxypropionoguanamine

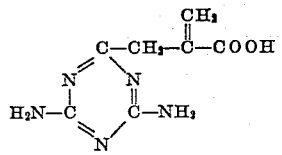

37.2 parts of diethyl itaconate were caused to react with 40 parts of biguanide in about 140 parts of methanol. Within an hour the guanamine began to precipitate and the reaction mixture was allowed to stand overnight. The product was removed by filtration and then extracted with several portions of water, in order to remove the biguanide salt of methylene-β-carboxypropionoguanamine which was recovered in a yield of about 11% from the water solution by acidification to a pH of about 4.0. The yield of itaconoguanamine, which was left from the above water extraction was about 42%.

Example 10

Levulinoguanamine

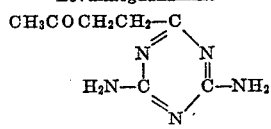

Twenty-five parts of biguanide were dissolved in 160 parts of methanol, filtered, and 43 parts of ethyl levulinate added. Two products were formed in about equimolecular amounts with a yield of about 40% of each. The first was levulinoguanamine which after recrystallization from ethanol was recovered in the form of fine white crystals melting at 184–185° C. The other product was probably a pyrimidine of the following formula:

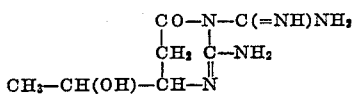

On recrystallization from water and acetone it melted with decomposition at 305–310° C. and gave evidence of being the pyrimidine. The formula of the by-product was not conclusively proven.

Example 11

4-N-phenyl-β-methoxypropionoguanamine

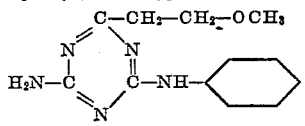

70.8 parts of phenyl biguanide were dissolved in 160 parts of methanol and 88.5 parts of methyl-β-methoxypropionate and 9.2 parts of sodium methoxide were added. The guanamine precipitated out after standing for a day and after recrystallization from ethanol, water and toluene, was obtained in the form of a solid melting at 118° C. and the yield was about 40%.

Example 12

Lactoguanamine

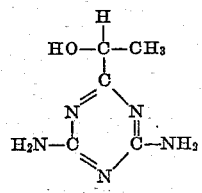

To a filtered solution of 21.2 parts of biguanide in about 80 parts of methanol was added 23.6 parts of ethyl lactate. The solution became rather warm and the odor of ammonia was very distinct. Within five minutes a colorless solid commenced to separate from solution. After standing for 20 days, the solid was filtered, washed with a little methanol and allowed to dry. Addition of an equal volume of carbon tetrachloride to the filtrate did not precipitate any solid and it was discarded. The colorless product was obtained in a 51.5% yield and melted at 249° C. After recrystallization of a small amount of the product from water, it melted at 254° C.

Example 13

Malonoguanamine

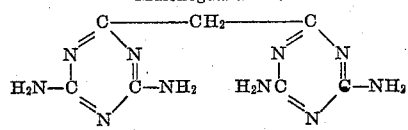

and

Carboxyacetoguanamine

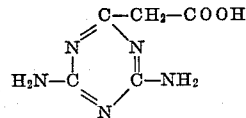

One hundred and twenty-five parts of ethyl malonate were added to 202 parts of biguanide dissolved in 1000 parts of methanol. Within an hour a product began to precipitate from the solution and was aided by agitation. This insoluble product, which was malonoguanamine was obtained by filtration in a yield of about 5%. The filtrate containing the biguanide salt of carboxyacetoguanamine was acidified to a pH of about 4 in order to precipitate the free guanamine which was obtained in a yield of about 80%.

Example 14

Succinoguanamine

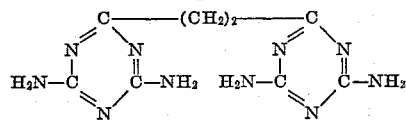

and

β-Carbomethoxyproprionoguanamine

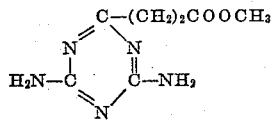

Two hundred nine parts of ethyl succinate were added to 101 parts of biguanide dissolved in 400 parts of warm methanol. Within a few minutes the product began to precipitate from the solution and after standing overnight the product was filtered and washed with methanol. This material was then extracted with about 300 parts of hot ethanol, which dissolved the β-carbomethoxypropionoguanamine melting at 159° C. The residue left from the alcohol extraction was succinoguanamine melting above 335° C., which could be further purified by dissolving in warm dilute hydrochloric acid solution, followed by precipitation with ammonium hydroxide. When the amount of biguanide was doubled the succinoguanamine was obtained in about 75% yield and the mono-guanamine was absent.

Example 15

Glutaroguanamine

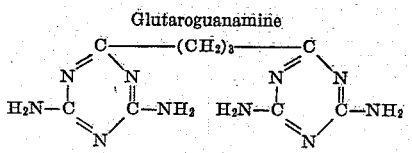

One hundred and seventy-nine parts of ethyl glutarate were added to 202 parts of biguanide dissolved in 1000 parts of methanol. The product began to precipitate from the solution within five minutes, however, the reaction mixture was allowed to stand before filtration. The yield of crude glutaroguanamine having the above formula was about 55% and after purification the yield of product melting above 340° C. was 50%.

Example 16

Adipoguanamine

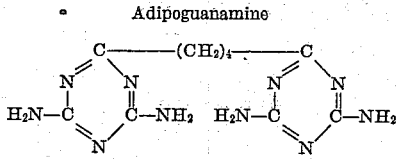

To 40 parts of biguanide dissolved in 160 parts of methanol was added 33 parts of methyl adipate. The guanamine began to precipitate from the solution within a few minutes and appeared complete in about two hours. After filtering and washing with more methanol, the yield of crude product melting at about 290° C. was 80%. A small portion of the product was recrystallized from a large volume of boiling water and the purified adipoguanamine of the above formula melted at 301° C.

Example 17

Sebacoguanamine

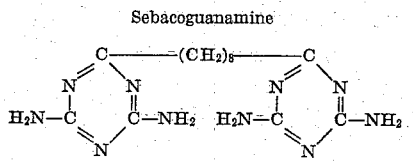

To 40 parts of biguanide dissolved in 160 parts of methanol was added 60 parts of butyl sebacate. After standing about an hour, the reaction mixture was almost solid with product, however, filtration was not undertaken until about 16 hours later. The yield of crude sebacoguanamine melting at 283° C. was 100%. Five parts of this product was dissolved in a hot mixture of 80 parts of ethanol and 30 parts of acetic acid. After cooling and filtering, the acetate salt was suspended in about 600 parts of water and made alkaline to a pH of about 8.4. The insoluble sebacoguanamine was filtered, washed with water and after drying, melted at 308° C.

When the amount of biguanide was cut in half and added slowly to a dilute methanol solution of butyl sebacate, a mixture was obtained containing about 33% of the sebacoguanamine and about 51% of the ω-carbomethoxypelargonoguanamine having the formula:

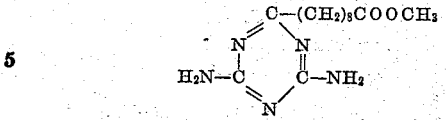

and about 5% of the ω-carbobutoxypelargonoguanamine having the formula:

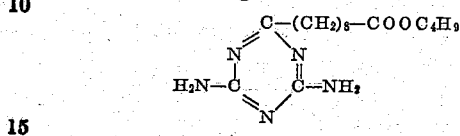

These yields are based on the biguanide used in the reaction.

Example 18

ω-Carboxypelargonoguanamine

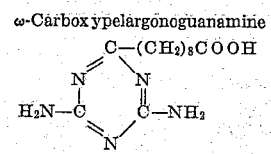

One hundred parts of biguanide were added to 280 parts of sodium butyl sebacate dispersed in about 1200 parts of methanol warmed to about 55-60° C. The reaction mixture was stirred at room temperature for about 24 hours. After filtering and washing with methanol, the sodium salt was dissolved in about 2500 parts of water, and filtered hot. The filtrate was acidified to a pH of about 4.0 and the precipitated ω-carboxypelargonoguanamine was extracted with alcohol in order to remove any sebacic acid. The yield of purified product melting at 223-225° C. was 75%.

Example 19

β-Carboxyacryloguanamine

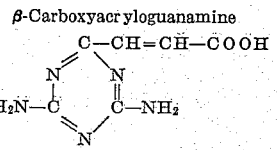

Seventy-three parts of methyl 2-ethylhexyl maleate were added to 25 parts of biguanide dissolved in 100 parts of methanol. The reaction mixture became warm and the product began to precipitate immediately. The yield of the crude biguanide salt of β-carboxyacryloguanamine was 82.5%. This product was dissolved in water and precipitated by acidifying to a pH of about 4.0. After filtering and washing, the guanamine was purified by dissolving in sodium hydroxide and reprecipitating with acid. The yield of pure product which did not melt but becomes brown at 335° C., was 75%. Maleoguanamine, the corresponding ditriazine, was absent.

Example 20

β-Carboxyacryloguanamine

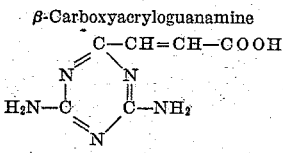

The same procedure as given in Example 19 was followed using 25 parts of biguanide, 51.6 parts of ethylfumarate and 100 parts of methanol. The yield of crude guanamine was 94%, which after dissolving in caustic soda and reprecipitating with acid, gave about 87% of purified product which did not melt but becomes brown at 335° C.

The fumaroguanamine, the corresponding ditriazine, was absent.

Example 21

Methoxy-N-octylcarbamylpropionoguanamine

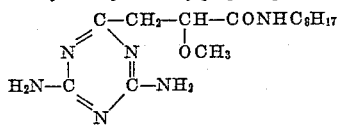

To 25 parts of biguanide dissolved in 100 parts of methanol was added 72 parts of methyl-N-octylmaleamate. The reaction mixture became deep purple and some product separated after standing several days. The reaction mixture was diluted with water which precipitated a dark oily material that was separated from the water. The oily product was extracted with about 1000 parts of hot 2% hydrochloric acid. The free base having the above probable formula was prepared by neutralization with sodium hydroxide, and after recrystallization from a 40% alcohol-water mixture the product melted at about 92° C. and on further drying, the melting point was raised to 146–148° C. The residue from the hydrochloric acid extraction was extracted with 1000 parts of hot water, which removed a slightly soluble hydrochloride salt. The free base was prepared by neutralization with sodium hydroxide and after recrystallization from a 35% alcohol-water mixture, the product melted at 60–62° C. Further drying raised the melting point to 80° C. This compound, which gave the same analytical data as the above methoxy-N-octylcarbamylpropionoguanamine, and which appears to have the following formula:

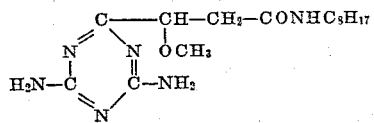

undergoes a change on heating above its melting point since it solidifies at about 105–110° C. and melts at 145° C.

Example 22

β-Sulfopropionoguanamine

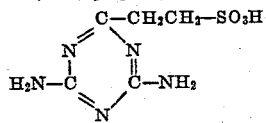

To 36 parts of anhydro β-sulfopropionic acid previously dissolved in 160 parts of hot methanol, was added 55 parts of biguanide. The solution became very warm and in about one-half hour crystallization began to take place. After standing for several hours, the biguanide salt of β-sulfopropionoguanamine was removed by filtration and dried over sulfuric acid. The yield of this crude salt melting at 229–231° C. was 82%. The free acid decomposing at 255–260° C. without melting was obtained by acidification of an aqueous solution of the biguanide salt and was purified by recrystallization from hot water.

Example 23

β-Sulfo-β-carboxypropionoguanamine

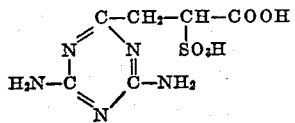

To 51 parts of diethyl sodium sulfosuccinate dissolved in 240 parts of methanol containing 4.2 parts of sodium metal was added 25 parts of biguanide. The reaction mixture was agitated in order to obtain a clear solution. In a few minutes product began to precipitate from the solution. After standing overnight the disodium salt of β-sulfo-β-carboxypropionoguanamine was removed by filtration and washed with methanol. The yield of this disodium salt was about 95% and was purified by recrystallization from 30% alcohol. The free β-sulfo-β-carboxypropionoguanamine was obtained by dissolving the disodium salt in the minimum amount of water and acidifying to a pH of about 4.0 with concentrated sulfuric acid. This product crystallized slowly, when the solution was cooled in an ice-salt bath. The β-sulfo-β-carboxypropionoguanamine is very soluble in water at temperatures in excess of about 25° C., and only moderately soluble in water at about 0–5° C.

A mixed sodium biguanide salt of β-sulfo-β-carboxypropionoguanamine can be prepared in a similar manner by omitting the sodium alkoxide and adding excess biguanide.

Example 24

ω-Sulfodecanoguanamine

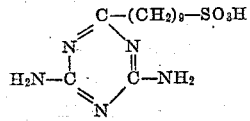

To 5 parts of biguanide in 120 parts of methanol were added 13.5 parts of butyl ω-sodium sulfodecanoate, which was prepared from ω-carbomethoxy-n-nonylpseudothiourea hydrobromide according to the method reported in J. A. C. S. 59, 1837, 2439 (1937). The reaction mixture was allowed to stand overnight and crystallization was aided by agitation. The crude sodium salt of ω-sulfodecanoguanamine was filtered and dissolved in hot water and treated with decolorizing carbon. The solution was made acid with hydrochloric acid and the free guanamine so obtained was washed with hot water and methanol. The yield of crude ω-sodium sulfodecanoguanamine was 14 parts which is a quantitative yield.

Example 25

4-N-phenyl-β-sulfopropionoguanamine

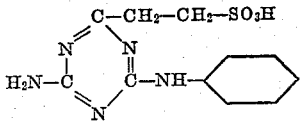

To 25 parts of methyl β-sulfopropionate dissolved in about 250 parts of methanol containing 7.0 parts of sodium metal was added 26.5 parts of phenylbiguanide. The reaction mixture was stirred for a short time in order to aid precipitation of the guanamine. After standing about 24 hours the product was filtered from the solvent and the free 4-N-phenyl-β-sulfopropionoguanamine was obtained by acidification of an aqueous solution of the sodium salt. The product crystallized from hot water in the form of fine colorless crystals.

Example 26

ω-Acetylundecanoguanamine

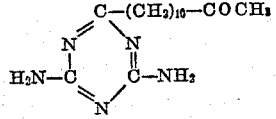

To a solution of 22 parts of biguanide in 160 parts of methanol was added 39 parts of methyl ω-acetylundecanoate which was prepared by the hydrolysis of ethyl ω-carbomethoxy-nonyl acetoacetate. The white crystalline guanamine which separated after standing overnight was removed by filtration and the filtrate was further concentrated to give a total yield of 93%. A sample recrystallized from ethyl acetate and then acetone, melting at 158–159° C.

*Example 27*

γ—Nitrovaleroguanamine

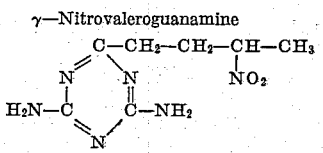

To a solution of 6 parts of sodium metal dissolved in 300 parts of methanol was added 25 parts of biguanide and then 45 parts of methyl-γ-nitrovalerate, which was prepared from acrylonitrile and nitroethane. After standing for 60 hours the solid sodium γ-nitrovaleroguanamine crystallized from the solution and was obtained in a yield of 98%. The product was dissolved in a 90% alcohol and on cooling the fine colorless product crystallized.

*Example 28*

ω-Bromodecanoguanamine

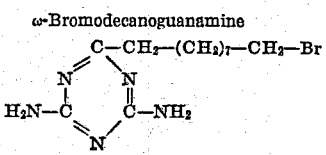

To a solution of 22 parts of biguanide dissolved in 240 parts of methanol was added 58 parts of methyl ω-bromodecanoate, which was prepared by treating ω-hydroxydecanoic acid with dry hydrogen bromide at a temperature of 140°–150° C. followed by esterification. The reaction mixture was allowed to stand overnight and the precipitated colorless product was removed by filtration. The yield of crude product was 81%. This material, melting at 143°–144° C., was not pure ω-bromodecanoguanamine but contained a small amount of ω-carbomethoxypelaragonoguanamine which was formed from the methyl sebacate present in the methyl ω-bromodecanoate.

*Example 29*

9,10-dibromostearoguanamine

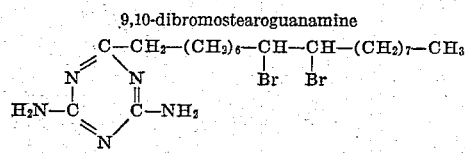

To a solution of 10 parts of biguanide dissolved in 80 parts of methanol was added 50 parts of methyl 9,10-dibromostearate dissolved in 120 parts of ethanol. After standing several days 2 parts of a crystalline solid had precipitated and was removed by filtration. This material proved to be biguanide hydrobromide. The alcohol filtrate was evaporated to a small volume and about 100 parts of acetone were added, which precipitated an additional 4 parts of biguanide hydrobromide. Since the product did not crystallize from the above volume of acetone, part of the solvent was removed and a waxy material separated on cooling. The 16 parts of light yellow solid was recrystallized three times from acetone and melted at 93–96° C. This product analyzed for 83% 9,10-dibromostearoguanamine.

The term "negative substituent" as it is used in the present specification and claims has the following meaning: a substituent group which by its introduction into an organic compound causes the latter to become more negative, that is, less basic and so tends to render the hydrogen atoms of the compound replaceable by metals. Examples of such "negative substituents" are the cyano, carboxy, carbalkoxy, sulfo, nitro, acid amide, carbonyl, hydroxy and alkoxy groups.

What I claim is:

1. A process of preparing substituted guanamines having the structural formula R—G, in which G is a guanamine radical, R is an aliphatic radical having a "negative substituent" in the hydrocarbon chain, and the bond between R and G is a carbon to carbon bond, which comprises the steps of dissolving a biguanide in a solvent therefor, adding thereto an ester of an aliphatic carboxylic acid having a negative substituent in the hydrocarbon chain, carrying the resultant reaction substantially to equilibrium and isolating the resultant 2-substituted guanamine.

2. A process according to claim 1, characterized in that the solvent used is a lower monohydric paraffin alcohol.

3. A process of preparing substituted guanamines having the structural formula

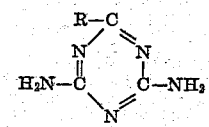

in which R is an aliphatic radical having a "negative substituent" in the hydrocarbon chain, the bond between R and G being a carbon-to-carbon bond, which comprises the steps of dissolving biguanide in a solvent therefor, adding thereto an ester of an aliphatic carboxylic acid having a negative substituent in the hydrocarbon chain, carrying the resultant reaction substantially to equilibrium and isolating the resultant 2-substituted guanamine.

4. A process according to claim 3 characterized in that the solvent used is a lower monohydric paraffin alcohol.

5. A process of preparing substituted guanamines having the structural formula R—G in which G is a guanamine radical, R is an aliphatic radical containing a cyano substituent in the hydrocarbon chain and the bond between R and G is a carbon-to-carbon bond, which comprises the steps of dissolving a biguanide in a suitable solvent therefor, adding thereto an ester of a cyano substituted aliphatic carboxylic acid, carrying the reaction substantially to an equilibrium and isolating the resultant 2-cyano aliphatic substituted guanamine.

6. A process of preparing substituted guanamines having the structural formula

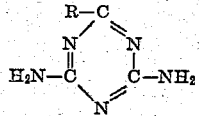

in which R is an aliphatic radical containing a cyano substituent in the hydrocarbon chain and the bond between R and G is a carbon-to-carbon bond, which comprises the steps of dissolving biguanide in a solvent therefor, adding thereto an ester of a cyano substituted aliphatic carboxylic acid, carrying the reaction substantially to an equilibrium and isolating the resultant 2-cyano aliphatic substituted guanamine.

7. A method of preparing cyanoacetoguanamine which comprises dissolving biguanide in a solvent therefor, adding thereto ethyl cyanoacetate, carrying the reaction substantially to equilibrium and isolating the resultant cyanoacetoguanamine.

8. Cyanoacetoguanamine having the formula:

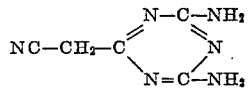

9. A process of preparing 2-(4-ethyl-2-cyano)-octeno-guanamine having the structural formula

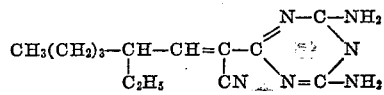

which comprises the steps of dissolving biguanide in a suitable solvent therefor, adding thereto an ester of 2-(4-ethyl-2-cyano)-octenoic acid, carrying the reaction substantially to equilibrium, and isolating the resultant 2-(4-ethyl-2-cyano)-octenoguanamine.

10. 2-(4 - ethyl - 2 - cyano) - octenoguanamine having the structural formula

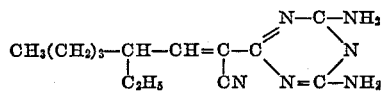

JACK THEO THURSTON.